Patented Oct. 2, 1928.

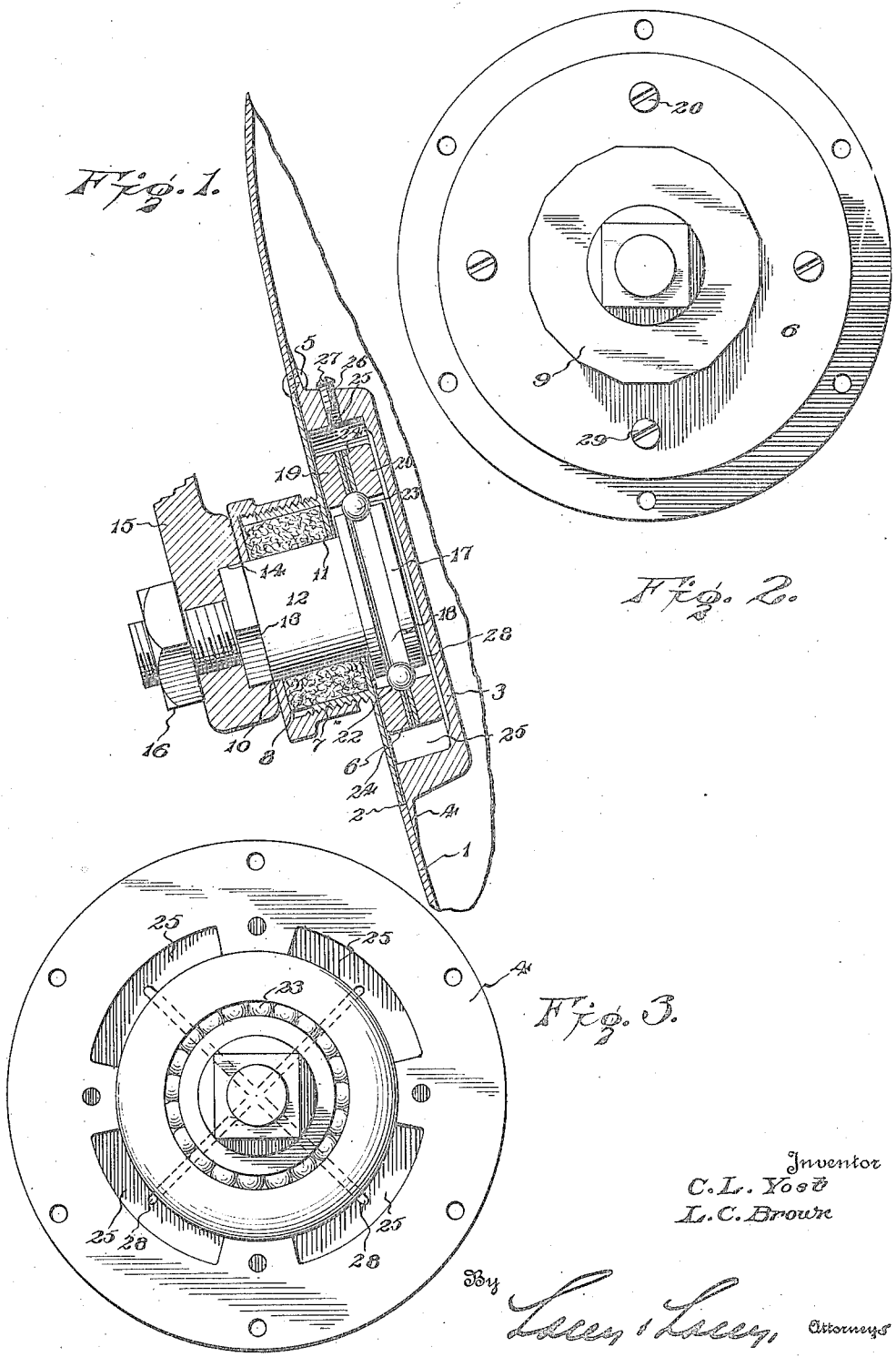

1,685,897

UNITED STATES PATENT OFFICE.

CLARENCE L. YOST AND LOYAL C. BROWN, OF KANORADO, KANSAS.

BEARING FOR DRILL DISKS.

Application filed March 19, 1927. Serial No. 176,754.

The present invention is directed to improvements in bearings for drill disks.

The primary object of the invention is to provide a device of this character so constructed that wear thereon is reduced to a minimum.

Another object of the invention is to provide a bearing of this nature so constructed that lubricant can be applied in a convenient manner and will be retained for a considerable time.

Another object of the invention is to provide means whereby the bearing can be easily adjusted to take up wear.

In the accompanying drawing:

Figure 1 is a vertical, central sectional view through the bearing.

Figure 2 is a side elevation.

Figure 3 is a rear view, the cover plates removed.

Referring to the drawing, 1 designates the disk which is of conventional shape and is provided with a central opening 2. The bearing comprises a boxing 3 formed with a peripheral flange 4, and it is to this flange that the disk 1 is secured by bolts 5. A cover plate 6 is provided for the rear side of the box 3 and is provided with an exteriorly threaded casing 7 in which packing 8 is placed, there being a cap 9 adapted to be threaded upon the casing to maintain the packing therein. The cap is formed with an opening 10 which coincides with the opening 11 formed in the cover plate 6. Engaged in these openings is the spindle 12 having a squared portion 13 adapted to fit in the recess 14 formed in the foot 15 of the planter, there being a threaded extension upon the spindle and engaged therewith is a nut 16 which serves to clamp the spindle to said foot, the squared portion 13 preventing rotation of the spindle.

The outer end of the spindle is formed with a circular head 17 having a ball race 18 therein, and also located within the boxing 3 are inner and outer rings 19 and 20, the inner peripheries of which have formed therein groove 22, which when in assembled relationship constitutes an outer ball race which coincides with the race 18, ball bearings 23 being maintained in said races. Interposed between the rings 19 and 20 are washers 24 which vary in thickness and may be adjusted to compensate for wear upon the parts. The boxing 3 is formed with pockets 25, preferably four in number, for the reception of suitable lubricant. The boxing is further provided with an opening 26 which communicates with one of the pockets and through which lubricant is introduced, there being a plug 27 for normally closing said opening. The base of the boxing is formed with grooves 28 which serve to conduct lubricant from the pockets to the head 17, thus assuring proper lubrication at all points.

The cover plate 6 is secured to the boxing by cap screws 29.

Having thus described the invention, we claim:

1. A bearing of the class described, comprising a boxing, a disk removably engaged in the boxing, a cover plate for the rear side of the boxing, said cover plate having a casing carried thereby, a cap threaded upon the casing, packing engaged in the casing, a spindle adapted for attachment to a planter, said spindle being engaged in the casing and having its outer end formed with a circular head adapted to engage in the boxing, said head having a ball race therein, rings engaged in the boxing, and having grooves formed in their inner peripheries to constitute a ball race which coincides with the ball race of the head, ball bearings engaged with the respective ball races, pockets formed in the bearings, and grooves formed in the base of the boxing, and affording communication between the respective pockets for distributing a lubricant within the boxing, and washers interposed between said rings.

2. A bearing of the class described, comprising a boxing having a flange, a drill disk detachably engaged with the flange, said boxing having pockets formed therein, grooves connecting the pockets, means for introducing lubricant into one of the pockets, a spindle adapted for attachment to the foot of a planter, said spindle having a head adapted for engagement in the boxing, rings engaged in the boxing and encircling the head, ball bearings interposed between the rings and head, a cover plate for the boxing, a casing carried by the cover plate, a cap detachably engaged with the casing, a packing located in the casing, said cover plate and cap having openings formed therein and in which the spindle is engaged.

In testimony whereof we affix our signatures.

CLARENCE L. YOST. [L. S.]
LOYAL C. BROWN. [L. S.]